United States Patent [19]

Hirahara

[11] Patent Number: 5,151,692
[45] Date of Patent: * Sep. 29, 1992

[54] BOARDING GATE SEAT CHECKIN APPARATUS AND METHOD

[75] Inventor: Kazuaki Hirahara, Ibaraki, Japan

[73] Assignee: Omron Tateisi Electronics Co., Kyoto, Japan

[*] Notice: The portion of the term of this patent subsequent to Jan. 8, 2008 has been disclaimed.

[21] Appl. No.: 517,483

[22] Filed: Apr. 30, 1990

Related U.S. Application Data

[63] Continuation of Ser. No. 281,024, Dec. 7, 1988, abandoned.

[30] Foreign Application Priority Data

Dec. 11, 1987 [JP] Japan .................................. 62-314783

[51] Int. Cl.⁵ ............................................. H04B 1/00
[52] U.S. Cl. .................. 340/825.28; 364/407; 235/384
[58] Field of Search .................. 340/825.28, 825.29, 340/825.3, 825.32, 825.35; 364/401, 407, 200, 900; 235/380, 382, 375, 376, 383, 384

[56] References Cited

U.S. PATENT DOCUMENTS

| | | | |
|---|---|---|---|
| 3,622,995 | 11/1971 | Dilks et al. | 364/407 |
| 3,750,103 | 7/1973 | Angus et al. | 340/825.28 |
| 4,449,186 | 5/1984 | Kelly et al. | 364/407 |
| 4,711,994 | 12/1987 | Greenberg | 340/825.28 |
| 4,752,876 | 6/1988 | Couch et al. | 340/825.28 |
| 4,918,298 | 4/1990 | Tanabe et al. | 235/384 |
| 4,984,156 | 1/1991 | Mekata | 364/407 |

FOREIGN PATENT DOCUMENTS

| | | | |
|---|---|---|---|
| 0270080 | 6/1988 | European Pat. Off. | 235/384 |
| 0271022 | 6/1988 | European Pat. Off. | 235/384 |
| 0000568 | 1/1985 | Japan | 340/825.28 |
| 0146360 | 8/1985 | Japan | 364/407 |
| 0173670 | 9/1985 | Japan | 364/407 |
| 0191362 | 9/1985 | Japan | 364/407 |
| 0233769 | 11/1985 | Japan | 364/407 |
| 1180916 | 9/1985 | U.S.S.R. | 364/407 |

OTHER PUBLICATIONS

Yanagawa et al., "HT-590/61 Airline Terminal Sys.", 1981, pp. 77-80.

Primary Examiner—Donald J. Yusko
Assistant Examiner—Dervis Magistre
Attorney, Agent, or Firm—Dickstein, Shapiro & Morin

[57] ABSTRACT

In a checkin gate apparatus, a seat table for checking practically occupied seats and also unoccupied seat deleting function are additionally provided to check which seats remain unoccupied, before the departure of passenger transport means such as airplanes. Further, unoccupied seat assigning function is provided for receiving tickets on which no seat is assigned and assigning an unoccupied seat thereto before departure. Since non-booked passengers can wait for an unoccupied seat at a boarding gate, it is possible to quickly achieve unoccupied seat assigning work.

7 Claims, 3 Drawing Sheets

BOARDING GATE SEAT CHECKIN APPARATUS AND METHOD

This application is a continuation of application Ser. No. 07/281,024 filed Dec. 7, 1988 now abandoned.

BACKGROUND OF THE INVENTION

1. Field of the Invention

The present invention relates to a checkin gate apparatus for checking passengers for passenger transport means such as airplanes.

2. Description of Prior Art

In the case of passenger transport means such as airplanes whose seats are all to be reserved, there are cases where some non-booked passengers can board a plane only after once reserved seats have been cancelled. In these cases, the checkin of booked passengers in ended about 20 minutes before the airplane departure, and all the seats unoccupied so far are regarded as being cancelled and allocated to non-booked passengers. In this case, conventionally, unoccupied seats are allocated to the non-booked passengers at the counter where air tickets are exchanged with boarding cards. Therefore, non-booked passengers who receive a boarding card (on which a cancelled seat is assigned) at the reservation counter pass through a security gate, go to a boarding gate for checkin, and then board an airplane.

In practice, however, since a distance between a reservation counter and a boarding gate is relatively far in many airports, it takes considerable time from when non-booked passengers receive a boarding card at the counter to when they go on a plane. Therefore, the departure of airplane tends to be delayed due to non-booked passengers who are waiting for cancelled seats. In addition, when these non-booked passengers are kept at a security gate or take much time to pass through the security gate, the departure is still further delayed. On the other hand, since unoccupied seats must be allocated to non-booked passengers at the reservation counter, there exists another problem in that the number of clerks inevitably increases.

SUMMARY OF THE INVENTION

The object of the present invention is to provide a checkin gate apparatus which can allocate cancelled seats to non-booked passengers at a boarding gate.

To achieve the above-mentioned object, a checkin gate apparatus according to the present invention comprises: (a) a seat table for a passenger transport means, for storing data representative of presence or absence of unoccupied seats; (b) unoccupied seat deleting means for receiving boarding cards in which a seat in assigned, checking validity thereof, and storing occupied data in said seat table with respect to seats read from the boarding cards determined to be valid; (c) unoccupied seat assigning means for receiving tickets on which a seat is not assigned, allocating an unoccupied seat with reference to said seat table, and discharging a boarding card on which a seat is assigned; and (d) means for activating said unoccupied seat assigning means a predetermined time before departure of the passenger transport means.

In the checkin gate apparatus according to the present invention, tickets for booked passengers are first received; seats for booked passengers are determined to be occupied in the seat table; after boarding of booked passengers has been closed, tickets for non-booked passengers are received; unoccupied or cancelled seats are assigned with reference to the seat table; and boarding cards on which a seat is assigned are discharged. Therefore, it is possible to keep non-booked passengers waiting near the passenger transport means, so that the departure of the passenger transport means is not delayed. Further, since cancelled seats can be assigned by the checkin gate apparatus, it is possible to reduce the work load of the clerks.

As described above, in the checkin gate apparatus according to the present invention, since unoccupied or cancelled seats can be assigned, it is possible to keep non-booked passengers waiting at the installation position (boarding gate) of this checkin gate apparatus. Therefore, it is possible to quickly assign seats and allow the passengers to quickly board a plane, without delaying the departure of the passenger transport means. Further, since seats can be assigned by the checkin gate apparatus, there exists an advantage that the work load of the counter clerks can be reduced.

DETAILED DESCRIPTION OF PREFERRED EMBODIMENT

Figure 1:
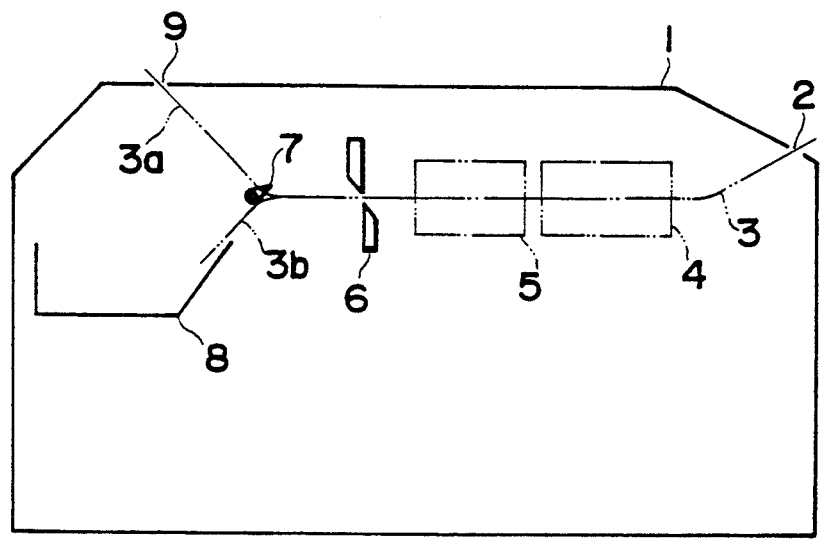
FIG. 1 is a diagrammatic view showing a checkin gate apparatus of an embodiment according to the present invention.

FIG. 1 is a diagrammatical structural diagram of a checkin gate apparatus as one embodiment of the present invention. The checkin gate apparatus 1 is installed at a boarding gate for airplanes to check boarding tickets of passengers. A ticket insertion slot 2 is formed in the upper portion on the front surface of the apparatus; and a ticket discharge slot 9 is formed on the upper surface at the rear portion of the apparatus. Between these two ticket insertion and discharge slots 2 and 9, a ticket conveying path 3 constructed by rollers, belts, etc. is provided. On the midway of this ticket conveying path 3, there are arranged an encode processing unit 4, a print processing unit 5, and a cutter 6 for cutting a boarding card from an air ticket when air tickets including a boarding card are received. The encode processing unit 4 having plural magnetic head reads data recorded on an inserted ticket and encodes (records) data thereon. The print processing unit 5 prints a seat number on the surface of a ticket when a ticket on which no seat is designated is inserted. Further, the ticket conveying path 3 is branched midway into a discharge conveying path 3a and a collection conveying path 3b by a flapper 7. The discharge conveying path 3a communicates with the discharge slot 9, while the collection conveying path 3b communicates with a collection box 8. When a ticket including both air ticket and boarding card together is inserted, the cutter 6 cuts off this ticket to discharge the boarding card through the discharge slot 9 and collect the air ticket into the collection box 8.

Figure 2:
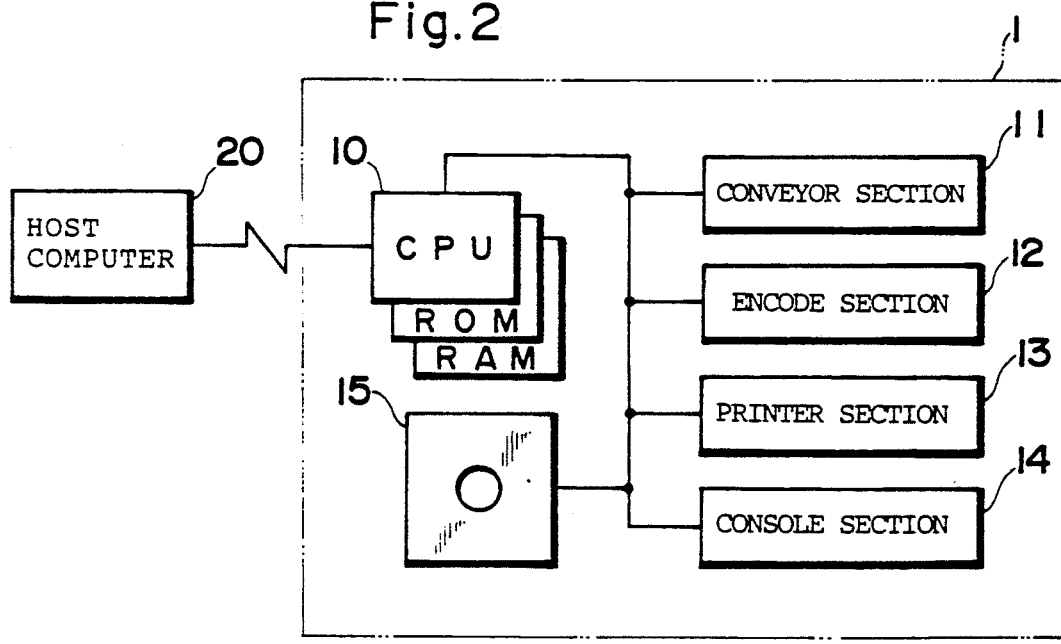
FIG. 2 is a block diagram showing a control section of the same checkin gate apparatus.

FIG. 2 is a block diagram showing a control section of the same checkin gate apparatus. A microcomputer 10 for controlling the entire operation of the apparatus is composed of a CPU, ROM and RAM. In the ROM, control process (control programs) is stored. In the RAM, data recorded on an inserted air ticket are temporarily stored. To this CPU 10, various elements are connected such as a conveyor section 11 including the ticket conveying path 3, the cutter 6, and the flapper 7; an encode section 12 including the encode processing unit 4; a printer section 13 including the print processing unit 5; a console section 14 for displaying messages to clerks and passengers; and a floppy disk device 15 for storing boarding data and a seat table described later. Further, the CPU 10 is connected to a host computer 20 installed at an aviation company via private telephone lines or public telephone lines. Data related to the seat table of an airplane are transmitted from this host computer 20.

Figure 3:
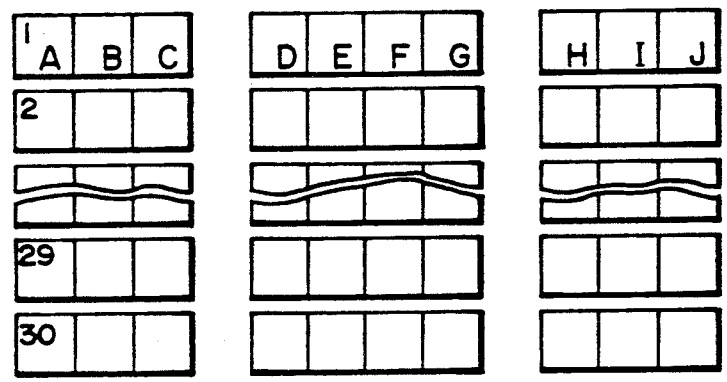
FIG. 3 is a view showing an exemplary seat table provided in the same checkin gate apparatus.

FIG. 3 shows a seat table to be set in the checking gate apparatus. The arrangement of seats are determined according to the model number of airplanes to which passengers embark. These seat tables are stored in the floppy disk device 15. In the seat table shown in FIG. 3, ten seats A to J are arranged in the lateral direction and thirty seats 1 to 30 are arranged in the longitudinal direction of the airplane. A data indicative of occupied or unoccupied seat is stored in each memory area corresponding to each seat.

Figure 4:
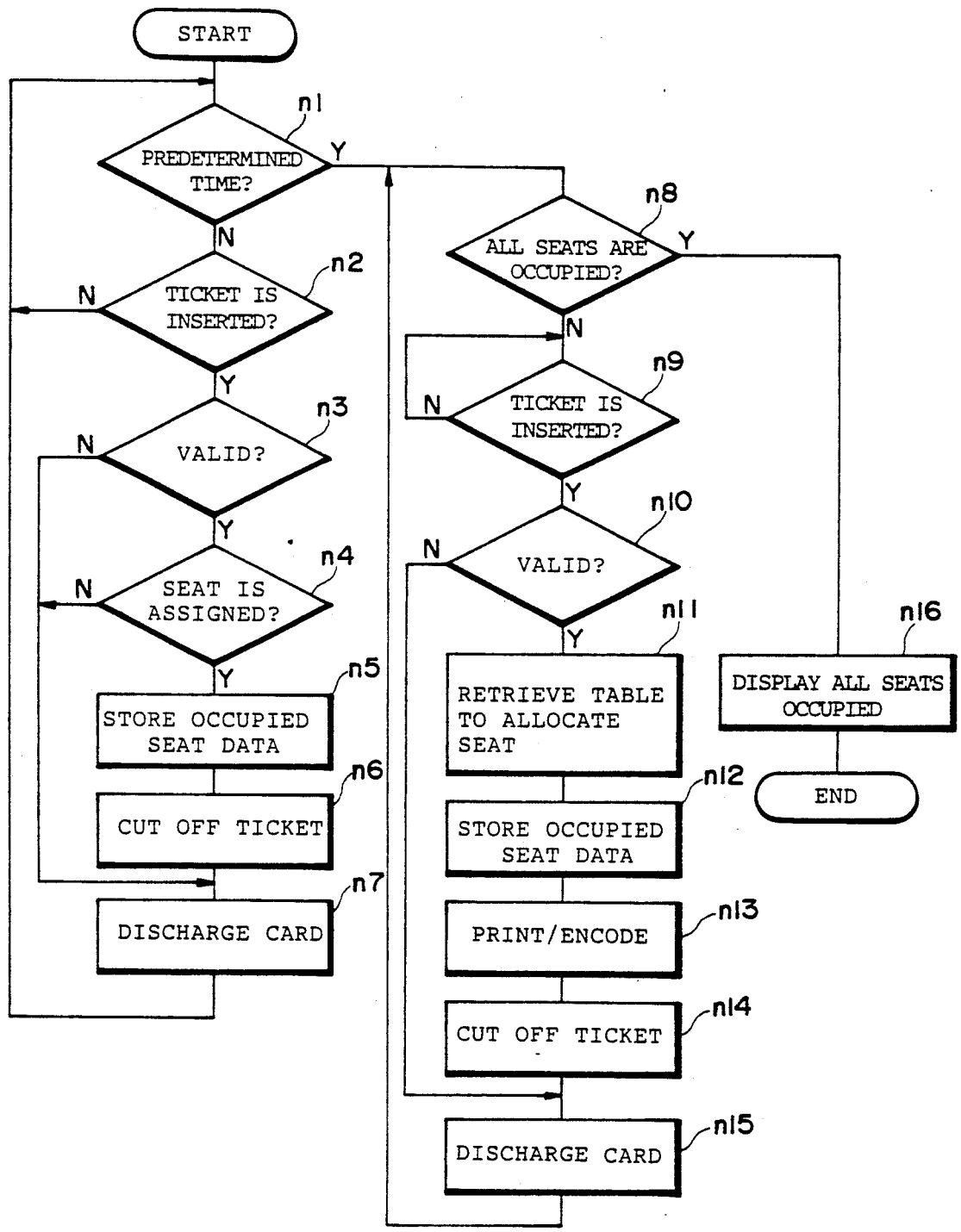
FIG. 4 is a flowchart for assistance in explaining the operation of the same checkin gate apparatus.

FIG. 4 is a flowchart showing the operation of the checkin gate apparatus. When checkin starts, CPU checks whether the current time time is a predetermined time (20 min. before departure) (in step n1). If the current time is before a predetermined time, CPU checks whether a ticket including a boarding card is inserted (in step n2). Passengers who do not board the plane before the predetermined time (e.g. 20 min) before departure are regarded as having their boarding cancelled and therefore the reservation is released. When a ticket including a boarding card is inserted before a predetermined time (in step n2), CPU reads data magnetically recorded on the ticket and checks whether the ticket is valid and seat is designated (in steps n3 and n4). Here, a seat assigning data is also magnetically recorded on the ticket. Only passengers whose seat has already been assigned at the reservation counter are checked before the predetermined time. When a valid ticket on which a seat is assigned is inserted, the CPU deletes the seat number corresponding thereto from the seat table to thereby store data indicative of a practically occupied seat (in step n5). The CPU controls the cut off of a boarding card from the air ticket (in step n6) and discharges only the boarding card (in step n7), returning to step n1.

On the other hand, when the current time is within the predetermined time, i.e. 20 min. before departure, the CPU proceeds to step n8 to check whether all the seats have been occupied (in step n8). If occupied, CPU displays "ALL SEATS OCCUPIED" (in step n16), ending control. If all seats are not yet occupied, the CPU starts to receive boarding of non-booked passengers. That is, the CPU controls the checkin gate apparatus to receive an air ticket on which no seat is designated (in step n9) and reads data from the inserted ticket to check whether the ticket is valid (in step n10). If valid, the CPU retrieves the seat table to assign an unoccupied seat (in step n11) and deletes the seat number corresponding thereto from the seat table to store data indicative of a practically occupied seat (in step n12). Thereafter, boarding data such as flight number, seat number, etc. are printed on the air ticket by the printing section 13 and encoded (recorded) on a magnetic tape surface on the ticket by the encode section 12 (in step n13). The CPU then controls the cut off the boarding card from the air ticket (in step n14). The air ticket is collected into the collection box 8 and only the boarding card is discharged through the discharge slot 9 (in step n15), returning to step n8. Further, in case an air ticket on which a seat is assigned is inserted after the predetermined time, e.g. within 20 mins of departure, since the assigned seat has already been cancelled, it is necessary for the passenger to obtain a new seat by starting the operation beginning from the step n8.

I claim:

1. A checkin apparatus comprising:
   (a) a checkin gate disposed near a boarding gate for a passenger transport means, said checkin gate comprising:
   (b) a seat table for said passenger transport means for storing data representative of the presence or absence of unoccupied seats;
   (c) checking means for checking whether a current time is within a predetermined time period before departure of said passenger transport means;
   (d) unoccupied seat deleting means, connected to said seat table and to said checking means, operative when said current time is before said predetermined time period, for receiving boarding cards on which a seat is assigned, checking the validity of said boarding cards, storing occupied data in said seat table with respect to seats read from boarding cards determined to be valid, and releasing a received boarding card;
   (e) unoccupied seat assignment means, connected to said seat table and to said checking means operative when said current time reaches said predetermined time period, for receiving tickets on which a seat is not assigned, assigning a seat which is not yet occupied to said ticket with reference to said seat table, updating said seat table to identify the assigned seat as occupied, and discharging a boarding card containing data identifying said assigned seat; and
   (f) means connected to said seat table and to said checking means, for determining, after said current time reaches said predetermined time period, whether all seats have been occupied with reference to said seat table.

2. A method of operating a checkin apparatus having a checkin gate disposed near a boarding gate for a passenger transport means and a seat table for said passenger transport means for storing data representative of the presence or absence of unoccupied seats, comprising the steps of:

checking whether a current time is within a predetermined time period before departure of said passenger transport means;

if said current time is before said predetermined time period, said method further comprises the steps of:
   receiving boarding cards on which a seat is assigned;
   checking the validity of said boarding cards;
   storing occupied data in said seat table with respect to seats read from said boarding cards determined to be valid; and
   releasing said received boarding cards; and if said current time reaches said predetermined time period, said method further comprises the steps of:
   checking whether all of said seats have been occupied with reference to said seat table; and
   if all said seats are not yet occupied, said method further comprises the steps of:
   receiving tickets on which a seat is not assigned;

assigning a seat which is not yet occupied to said ticket with reference to said seat table;

updating said seat table to identify said assigned seat as occupied; and discharging a boarding card containing data identifying said assigned seat.

3. The method of claim 2, further comprising the step of returning a boarding card if a seat is not assigned to the boarding card and if the current time is before said predetermined time period.

4. The method of claim 2, further comprising the step of displaying that all of said seats are occupied if so judged after said current time reaches said predetermined time period.

5. The checkin apparatus of claim 1, further comprising a returning means for returning said boarding card if a seat is not assigned to said boarding card and if the current time is before said predetermined time period.

6. The checkin apparatus of claim 1, further comprising a display for displaying that all of said seats are occupied if so judged after said current time reaches said predetermined time period.

7. A method of operating a checkin apparatus having a checkin gate disposed near a boarding gate for a passenger transport means, and a seat table for said passenger transport means for storing data representative of the presence or absence of unoccupied seats, said method comprising the steps of:

checking whether a current time is within a predetermined time period before departure of said passenger transport means;

if said current time is before said predetermined time period, said method further comprises the steps of:

receiving boarding cards and tickets on which a seat is assigned;

checking the validity of said boarding cards;

storing occupied data in said seat table with respect to seats read from said boarding cards determined to be valid; and releasing said received boarding cards and retaining said received tickets; and if said current time reaches said predetermined time period, said method further comprises the steps of:

checking whether all of said seats have been occupied with reference to said seat table; and if all said seats are not yet occupied, said method further comprises the steps of:

receiving tickets on which a seat is not assigned;

assigning a seat which is not yet occupied to said ticket with reference to said seat table;

updating said seat table to identify said assigned seat as occupied; and discharging a boarding card containing data identifying said assigned seat.

* * * * *